(12) United States Patent
Landvik (10) Patent No.: US 11,390,159 B2
(45) Date of Patent: Jul. 19, 2022

(54) GAS TANK ARRANGEMENT FOR AN INTERNAL COMBUSTION ENGINE

(71) Applicant: VOLVO TRUCK CORPORATION, Gothenburg (SE)

(72) Inventor: Sondre Landvik, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 383 days.

(21) Appl. No.: 16/625,606

(22) PCT Filed: Jul. 5, 2017

(86) PCT No.: PCT/EP2017/066820
§ 371 (c)(1),
(2) Date: Dec. 20, 2019

(87) PCT Pub. No.: WO2019/007506
PCT Pub. Date: Jan. 10, 2019

(65) Prior Publication Data
US 2021/0331583 A1    Oct. 28, 2021

(51) Int. Cl.
*B60K 15/03* (2006.01)
*B60K 15/063* (2006.01)
*B60K 16/00* (2020.01)

(52) U.S. Cl.
CPC ...... *B60K 15/063* (2013.01); *B60K 15/03006* (2013.01); *B60K 2015/0321* (2013.01); *B60K 2015/03026* (2013.01); *B60K 2015/0638* (2013.01); *B60K 2016/003* (2013.01)

(58) Field of Classification Search
CPC ............ B60K 15/063; B60K 15/03006; B60K 2015/03026; B60K 2015/0321; B60K 2015/0638; B60K 2015/03013; B60K 2016/003; F17C 2250/043; F17C 2270/0171
See application file for complete search history.

(56) References Cited

U.S. PATENT DOCUMENTS 5,540,208 A    7/1996  Kikutani
2003/0031970 A1  2/2003  Shimada et al.

FOREIGN PATENT DOCUMENTS

| DE | 19854581 A1 | 6/2000 |
| WO | 2017008934 A1 | 1/2017 |
| WO | 2017008935 A1 | 1/2017 |

OTHER PUBLICATIONS

International Search Report and Written Opinion dated Jun. 5, 2018 in corresponding International PCT Application No. PCT/EP2017/066820, 9 pages.

*Primary Examiner* — Stephen J Castellano
(74) *Attorney, Agent, or Firm* — Venable LLP; Jeffri A. Kaminski (57) ABSTRACT

A gas tank arrangement for an internal combustion engine of a vehicle is provided. In particular, a gas tank arrangement comprising a gas tank for containing a combustible fuel and an electrically propelled gas burning arrangement provided downstream the gas tank.

15 Claims, 4 Drawing Sheets

GAS TANK ARRANGEMENT FOR AN INTERNAL COMBUSTION ENGINE

This application is the national stage (Rule 371) of international application No. PCT/EP2017/066820 filed 5 Jul. 2017.

TECHNICAL FIELD

The present invention relates to a gas tank arrangement for an internal combustion engine. The invention also relates to a method for controlling a gas tank arrangement. The invention is applicable on vehicles, in particularly low, medium and heavy duty vehicles commonly referred to as trucks. Although the invention will mainly be described in relation to a truck, it may also be applicable for other type of vehicles operable by means of a combustible fuel.

BACKGROUND

In relation to propulsion systems for heavy duty vehicles, internal combustion engines are frequently used. These internal combustion engines are most often propelled by a combustible fluid such as e.g. diesel or petrol. However, in order to further reduce engine emissions of the vehicles, alternative propulsion methods and/or fuels are being used, either alone or in combination with the well known combustible fluids. These may include, for example, ethanol or electrical propulsion from an electric machine, etc.

As a further alternative, a combustible fuel, such as e.g. liquefied natural gas, compressed natural gas, DME, biogas, etc. has been found a suitable propulsion fuel for vehicles in the form of trucks. The combustible fluids can be used in combination with the combustible fuel for propelling the internal combustion engine, in the following also referred to as a dual fuel internal combustion engine. Since the residuals from the combustible fuel are relatively environmentally friendly in comparison to e.g. diesel fuel, pollution from the emissions thereof is reduced for these types of engines.

A problem with engines being propelled by the above described combustible fuel is that if venting of gas is necessary due to an increase in gas pressure within the tank to e.g. other position(s) of the system, there is a risk of environmentally harmful pollution. Venting of this kind may also have an economical aspect since the fuel consumption will increase. Venting may typically occur in case of combustion gas expansion in the gas tank.

There is thus a desire to reduce emission of environmentally harmful combustible fuels.

SUMMARY

It is an object of the present invention to provide a gas tank arrangement which at least partially overcomes the above described deficiencies. This is achieved by a method according to claim 1.

According to a first aspect of the present invention, there is provided a gas tank arrangement for an internal combustion engine of a vehicle, the gas tank arrangement comprising a gas tank for containing a combustible fuel; an electrically propelled gas burning arrangement provided downstream the gas tank; an electrical power generating arrangement connected to the electrically propelled gas burning arrangement for controllably delivery of electric power to the electrically propelled gas burning arrangement; and a control unit connected to the electrically propelled gas burning arrangement and to the electrical power generating arrangement, wherein the control unit is configured to determine a pressure level within the gas tank; compare the pressure level with a maximum allowable gas pressure level; determine a current power production capability of the electrical power generating arrangement; compare the current power production capability with a minimum required power level for propelling the gas burning arrangement; and if the pressure level within the gas tank is above the maximum allowable gas pressure level and the current power production capability of the electrical power generating arrangement is higher than the minimum required power level: control the gas burning arrangement to be operated by the electric power generated by the electrical power generating arrangement; and control the gas tank to deliver combustible fuel to the gas burning arrangement for combustion therein.

The wording "electrical power generating arrangement" should in the following and throughout the description be interpreted as an arrangement which is able to generate electrical power as well as to deliver electrical power to the electrically propelled gas burning arrangement. The electrically propelled gas burning arrangement is thus a gas burner which is operated by means of electrical power. Hence, for the gas burner to operate and to burn combustible fuel, the gas burner needs to be supplied by electrical power/current. According to an example embodiment described further below, the electrical power generating arrangement may comprise solar cells for generating electricity. Other alternatives are also conceivable, such as a wind turbine connected to the vehicle, etc.

The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

The present invention is based on the insight that gas tanks comprising combustible fuel needs to be ventilated in case the pressure exceeds a predetermined pressure limit. The ventilation is preferably made to a gas burning arrangement such that hazardous gas is prevented from reaching the ambient environment of the vehicle.

An advantage of the present invention is that combustible fuel will be delivered to the electrically propelled gas burning arrangement when there is a desire to burn off combustible fuel, and when there is sufficient power available for operating the electrically propelled gas burning arrangement by electricity generated by the electrical power generating arrangement. Hence, there is a reduced risk of emptying the vehicle battery. Thus, energy from a different power source than the vehicle battery is used for operating the electrically propelled gas burning arrangement. The electrically propelled gas burning arrangement may of course be connected to the vehicle battery, although the vehicle battery will only act as an alternative power source for the electrically propelled gas burning arrangement.

According to an example embodiment, the control unit may be further configured to determine an amount of combustible fuel which is combustible in the gas burning arrangement by means of the current power production capability of the electrical power generating arrangement;

and control the gas tank to delivery the amount of combustible fuel to the gas burning arrangement.

Accordingly, the control unit determines how much gas that could be burned off by the available electrical power in the electrical power generating arrangement. Thereafter, the control unit controls the gas tank to deliver such amount of combustible fuel. Hereby, at least a partial reduction of the pressure in the gas tank is achieved such that the pressure in the gas tank is reduced to a safer level. Another advantage is that an adaptive system is provided where the amount of gas delivered to the gas burning arrangement is based on the available electrical power in the gas burning electrical power generating arrangement According to an example embodiment, the gas tank arrangement may further comprise a first electrical storage arrangement connected between the electrical power generating arrangement and the gas burning arrangement.

The electrical storage arrangement may, for example, be a battery. The electrical storage should however not be construed as the same battery as the ordinary vehicle battery used for e.g. starting the engine, etc.

Hereby, electrical power generated in the electrical power generating arrangement can be directed to the electrical storage arrangement in case the tank is in no need of ventilation. Also, the electrical storage arrangement enables for a steadier and stable operation of the gas burning arrangement. Also, electrical power may be supplied from the electrical storage arrangement to the gas burning arrangement in the event the electrical power delivered from the electrical power generating arrangement is not sufficient to burn the desired amount of combustible gas.

According to an example embodiment, the control unit may be further connected to the first electrical storage arrangement, wherein the control unit is further configured to: compare the current power production capability of the electrical power generating arrangement with a maximum power level consumable by the gas burning arrangement; and control at least a portion of the electrical power generated by the electrical power generating arrangement to be provided to the first electrical storage arrangement if the current power production capability is higher than the maximum power level.

An advantage is thus that if the electrical power generating arrangement generates more electrical power than what is required by the gas burning arrangement, the electrical power can be stored in the first electrical storage arrangement instead of being wasted.

According to an example embodiment, the control unit may be further configured to control the first electrical storage arrangement to provide electrical power to the gas burning arrangement if the pressure level within the gas tank is above the maximum allowable gas pressure level and the current power production capability of the electrical power generating arrangement is lower than the minimum required power level.

Hereby, the first electrical storage arrangement can act as a backup supplier of electrical power to the gas burning arrangement.

According to an example embodiment, the gas tank arrangement may further comprise a valve unit arranged in fluid communication between the gas tank and the gas burning arrangement, wherein the control unit is connected to the valve unit and further configured to controllably arranged the valve unit between a first state in which combustible fuel is delivered from the gas tank to the gas burning arrangement, and a second state in which the gas tank is prevented from delivery of combustible fuel to the gas burning arrangement.

According to an example embodiment, the gas tank may further comprise a gas pressure sensor for detecting the gas pressure within the gas tank.

Hereby, a signal from the gas pressure sensor is delivered to the control unit for operation of the valve unit. The gas pressure sensor may be arranged to deliver a signal to the control unit before the gas pressure reaches the maximum allowable gas pressure limit in order to start the gas burning arrangement slightly before combustible fuel is delivered thereto.

According to an example embodiment, the electrical power generating arrangement may comprise a power generation sensor for detecting the present electric power generating level provided by the electrical power generating arrangement.

The power generating sensor is a sensor that detects the rate of the electrical power generated in the electrical power generating arrangement. Hence, the power generating sensor is arranged to transmit a signal to the control unit indicative of how much electrical power that can be delivered to the gas burning arrangement for propulsion thereof.

According to an example embodiment, the electrically propelled gas burning arrangement may be further electrically connected to a second electrical storage arrangement of the vehicle, the second electrical storage arrangement being further arranged to control start ignition of the internal combustion engine.

Hence, the second electrical storage arrangement may serve as further electrical power backup for operating the gas burning arrangement.

According to an example embodiment, the electrical power generating arrangement may comprise solar cells for generating electrical power.

Hereby, as the combustible fuel in the gas tank most often expands due to an increased temperature of the gas tank, which increased temperature is caused by sun exposure, the electrical power level of the electrical power generating arrangement will most often be sufficient at the times the gas tank is in need of ventilation. Accordingly, the electrical power is generated by means of solar energy, which solar energy on the other hand may cause the gas tank to be in need of ventilation.

According to an example embodiment, the solar cells may be arranged on at least one of a roof or a wind deflector of the vehicle.

The roof or wind deflector positions are exposed to large portions of sun radiation.

According to a second aspect, there is provided a method for controlling a gas tank arrangement for an internal combustion engine of a vehicle, the gas tank arrangement comprising a gas tank for containing a combustible fuel; an electrically propelled gas burning arrangement provided downstream the gas tank; an electrical power generating arrangement connected to the electrically propelled gas burning arrangement for controllably delivery of electric power to the electrically propelled gas burning arrangement, wherein the method comprises the steps of determining a pressure level within the gas tank; comparing the pressure level with a maximum allowable gas pressure level; determining a current power production capability of the electrical power generating arrangement; comparing the current power production capability with a minimum required power level for propelling the gas burning arrangement; and if the pressure level within the gas tank is above the maximum allowable gas pressure level and the current power production capability of the electrical power generating arrangement is higher than the minimum required power level: operating the gas burning arrangement by the electric power generated by the electrical power generating arrangement; and providing combustible fuel from the gas tank to the gas burning arrangement for combustion therein.

Effects and features of the second aspect are largely analogous to those described above in relation to the first aspect.

According to a third aspect, there is provided a vehicle comprising an internal combustion engine and a gas tank arrangement according to any one of the example embodiments described above in relation to the first aspect, wherein the gas tank arrangement is arranged upstream the internal combustion engine for delivery of combustible fuel to the internal combustion engine.

According to a fourth aspect, there is provided a computer program comprising program code means for performing the steps described above in relation to the second aspect when the program is run on a computer.

According to a fifth aspect, there is provided a computer readable medium carrying a computer program comprising program means for performing the steps described above in relation to the second aspect when the program means is run on a computer.

Effects and features of the third, fourth and fifth aspects are largely analogous to those described above in relation to the first aspects.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of exemplary embodiments of the present invention, wherein.

DETAILED DESCRIPTION OF EXAMPLE EMBODIMENTS OF THE INVENTION

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference character refer to like elements throughout the description.

Figure 1:
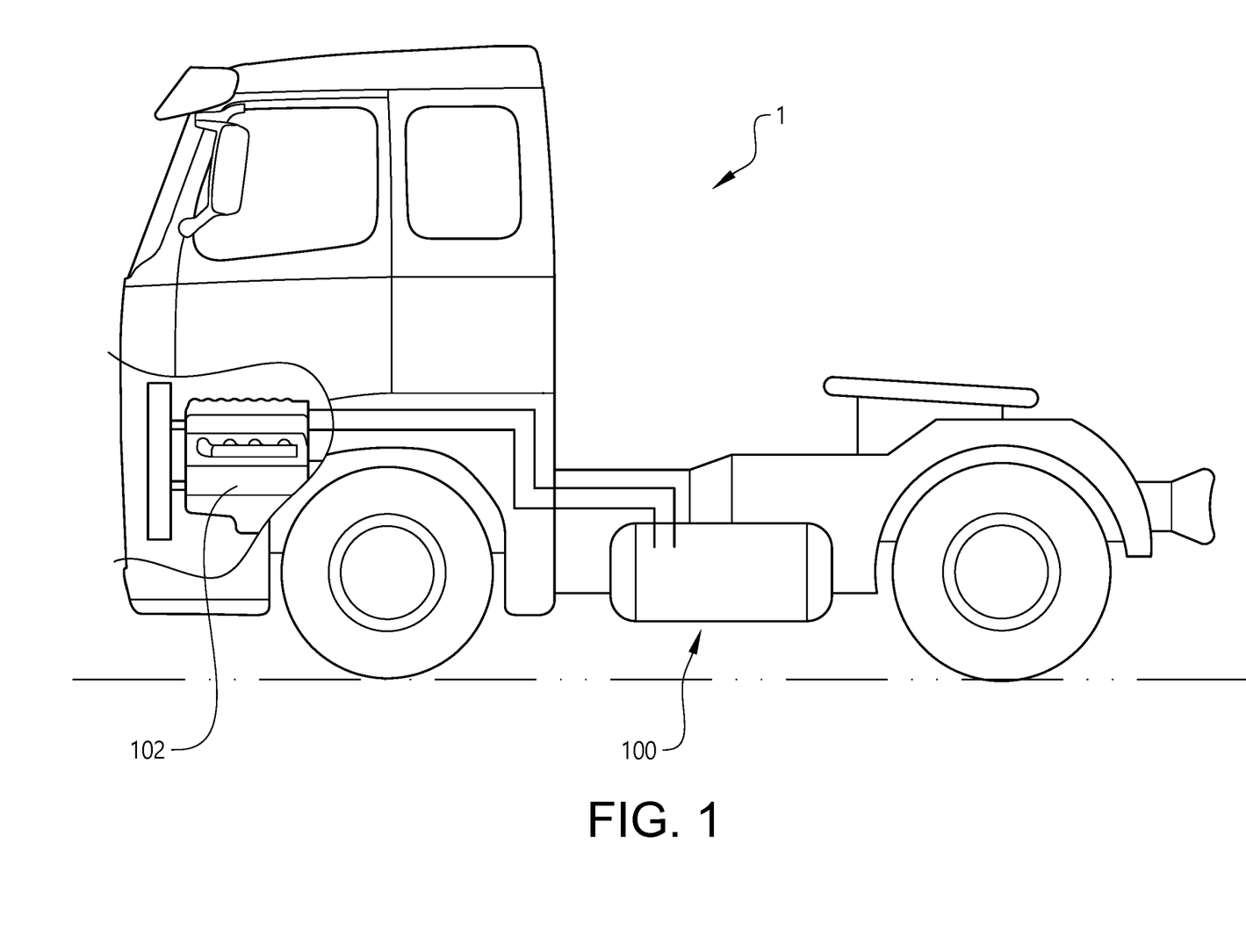
FIG. 1 is a lateral side view illustrating an example embodiment of a vehicle in the form of a truck.

With particular reference to FIG. 1, there is provided a vehicle 1 comprising an internal combustion engine 102.

The internal combustion engine 102 may, for example, be a dual fuel internal combustion engine 102 which is connected to a fuel tank, such as e.g. a diesel tank, and to a gas tank arrangement 100, which gas tank arrangement 100 will be described in further detail below. The internal combustion engine 102 may thus be propelled by both conventional fuels such as e.g. diesel or petrol, as well as by a combustible fuel such as e.g. liquefied natural gas, compressed natural gas, DME, biogas, etc. The combustible fuel may be provided either in a liquid phase i.e. a liquid/liquefied combustible fuel, or in a gas phase. The vehicle 1 depicted in FIG. 1 is a heavy duty vehicle 1, here in the form of a truck, for which the inventive gas tank arrangement 100 is particularly suitable for.

Figure 2:
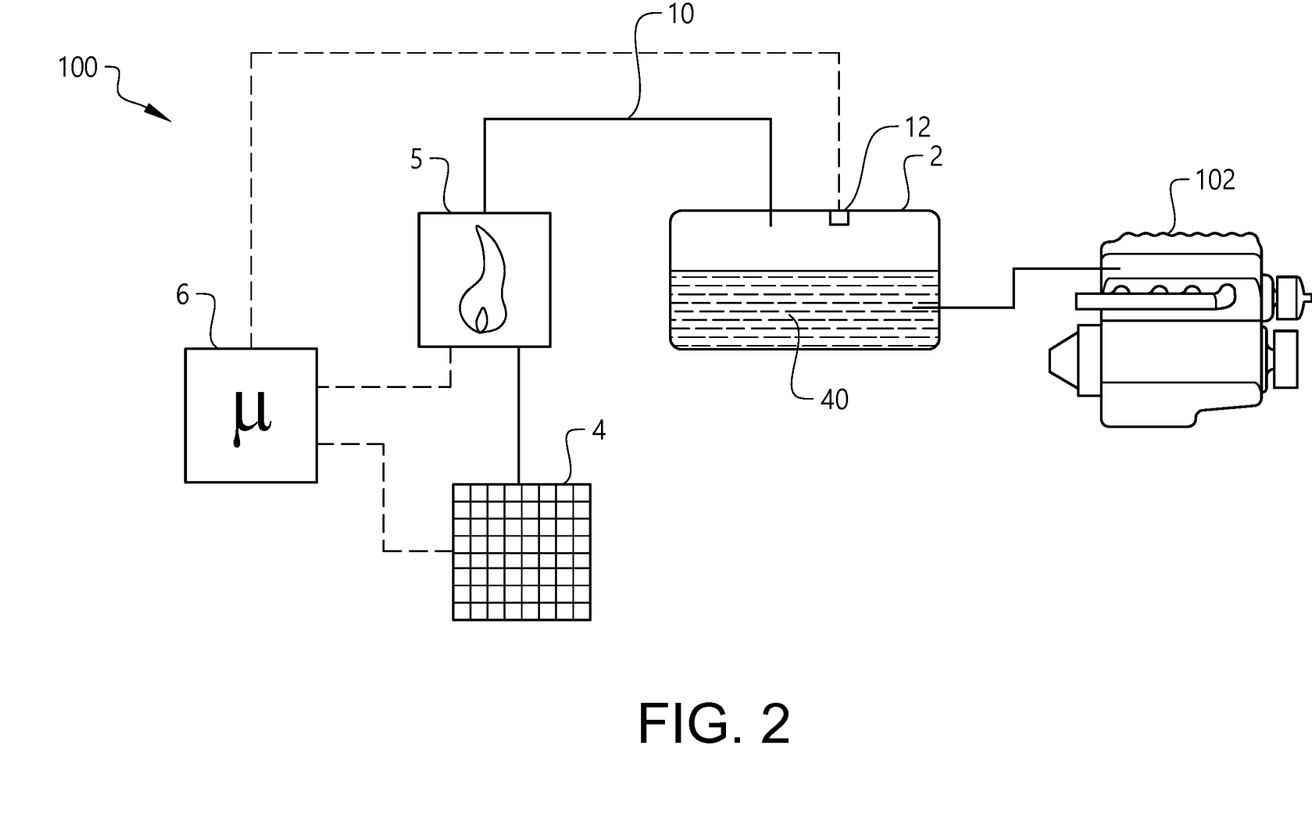
FIG. 2 is a schematic illustration of a gas tank arrangement according to an example embodiment.

With reference to FIG. 2, there is depicted a gas tank arrangement 100 according to an example embodiment. As described above, and as depicted in FIG. 2, the gas tank arrangement 100 is connected to the internal combustion engine 102. It should be readily understood that the depicted connection between the gas tank arrangement 100 and the internal combustion engine 102 is schematic, and that there may be components arranged there between, such as e.g. fluid pumps, pressure tanks, etc.

As can be seen in FIG. 2, the gas tank arrangement 100 comprises a gas tank 2 provided with a combustible fuel 40. The combustible fuel 40 may be provided in a liquid state, although a gaseous state is commonly also present in the upper region of the gas tank 2. The gas tank arrangement 100 further comprising a gas burning arrangement 5 arranged in fluid communication with the gas tank 2 via a gas burner conduit 10. The gas burner conduit 10 is preferably connected to the gas tank 2 at an upper region thereof, preferably on top of the gas tank 2. Hereby, gaseous combustible fuel can be delivered to the gas burning arrangement 5. The gas burning arrangement 5 is operated by means of electric power. The gas burning arrangement 5 is thus also referred to as an electrically propelled gas burning arrangement 5. The gas tank arrangement 100 further comprises an electrical power generating arrangement 4 connected to the gas burning arrangement 5 for propulsion thereof. The electrical power generating arrangement 4 is thus arranged to generate electrical power which is fed to the gas burning arrangement 5. The electrical power generating arrangement 4 may preferably comprise solar panels arranged on e.g. the roof of the vehicle 1 as will be described in further detail below. In such case, electrical power is generated by the solar radiation on the solar panels.

Furthermore, the gas tank arrangement comprises a control unit 6. The control unit 6 is connected to the gas burning arrangement 5, the electrical power generating arrangement 4 and to a pressure sensor 12 arranged in connection to the gas tank 2. The control unit 6 is thus arranged to receive a signal from the pressure sensor 12 indicative of a pressure level within the gas tank 2. The control unit 6 is also arranged to receive a signal from the electrical power generating arrangement 4, or from a power generating sensor (indicated by numeral 11 in FIG. 3) arranged in connection with the electrical power generating arrangement 4. Hereby, the control unit 6 receives a signal indicative of the present electrical power level of the electrical power generating arrangement 4, i.e. how much electrical power the electrical power generating arrangement 4 is able to supply to the gas burning arrangement 5. The control unit 6 is further connected to the gas burning arrangement 5. Hereby, the control unit 6 can control the gas burning arrangement 5 to be operated by the electrical power generated by the electrical power generating arrangement 4, i.e. to control the gas burning arrangement 5 to be switched on or off.

By means of the arrangement depicted in FIG. 2, gaseous combustible fuel contained in the gas tank 2 can be supplied to the gas burning arrangement 5 when the gas tank 2 is in need of ventilation, i.e. when the gas pressure exceeds a predetermined maximum allowable gas pressure level. Also, the control unit 6 is arranged to receive a signal indicative of the pressure level in the gas tank 2 and to control the gas burning arrangement to be switch on when the gas pressure in the gas tank 2 exceeds the predetermined maximum allowable gas pressure level, such that the gas burning arrangement 5 can combust the excess gas delivered from the gas tank 2. The process of controlling the gas tank arrangement 100 will be given below.

Figure 3:
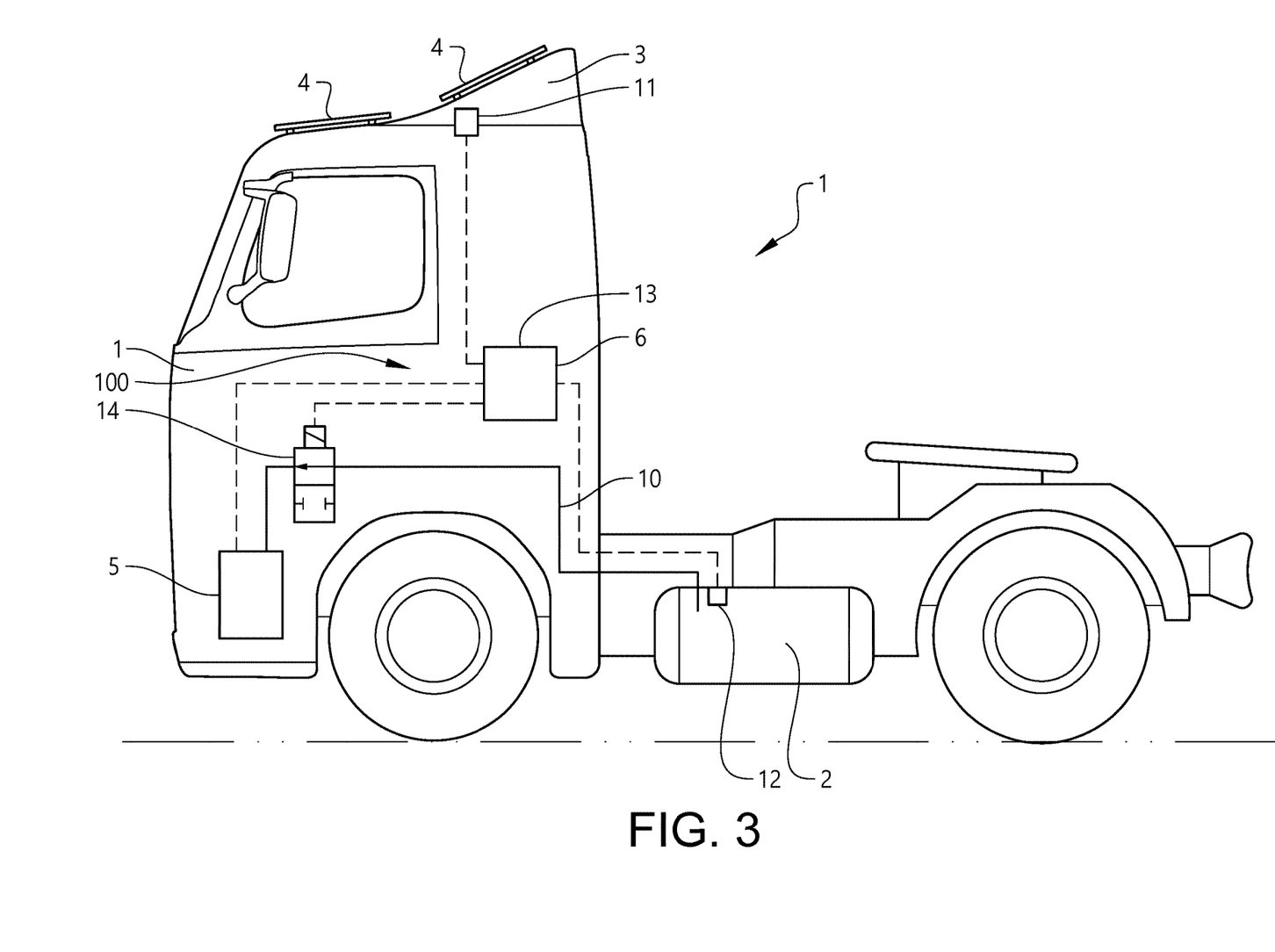
FIG. 3 is a schematic illustration of a gas tank arrangement connected to the vehicle according to another example embodiment.

With reference to FIG. 3, there is depicted a gas tank arrangement 100 according to another example embodiment. In FIG. 3, the gas tank arrangement 100 is illustrated as connected to the vehicle 1. The gas tank arrangement 100 depicted in FIG. 3 also comprises the above described gas tank 2, gas burning arrangement 5, electrical power generating arrangement 4 and control unit 6. As depicted in FIG. 3, the electrical power generating arrangement 4 is connected to the roof and wind deflector 3 of the vehicle 1 and comprises solar panels for generating electrical power. As also depicted in FIG. 3, a power generating sensor 11 is arranged in connection with the electrical power generating arrangement 4 and filing the same function as described above in relation to the description of FIG. 2.

The example embodiment depicted in FIG. 3 further comprises a valve unit 14 arranged in the gas burner conduit 10. Hence, the valve unit 14 is arranged in fluid communication with the gas tank 2 and the gas burning arrangement 5. Although the valve unit 14 is depicted as arranged at a position spaced apart from the gas tank 2, it should be readily understood that the valve unit 14 may be arranged in direct physical connection with the gas tank 2. Hence, the position of the valve unit 14 is merely schematic for simplicity of understanding. Furthermore, the valve unit 14 is also connected to the control unit 6 such that the control unit 6 is able to control the operation of the valve unit 14. Hereby, the control unit 6 is arranged to controllably arranged the valve unit 14 between a first state in which combustible gaseous fuel is allowed to be delivered from the gas tank 2 and to the gas burning arrangement 5, and a second state in which the gas tank 2 is prevented from delivery of combustible gaseous fuel to the gas burning arrangement 5.

Furthermore, the embodiment depicted in FIG. 3 also comprises a first electrical storage arrangement 13 connected between the electrical power generating arrangement 4 and the gas burning arrangement 5. Hereby, the electrical power generating arrangement 4 can supply electrical power to the first electrical storage arrangement 13 before delivery of electrical power from the first electrical storage arrangement 13 to the gas burning arrangement 5. In FIG. 3, the first electrical storage arrangement 13 and the control unit 6 have been depicted as arranged within the same compartment. This should be construed as purely schematically, as the first electrical storage arrangement 13 and the control unit 6 can be arranged at different positions spaced apart from each other.

Figure 4:
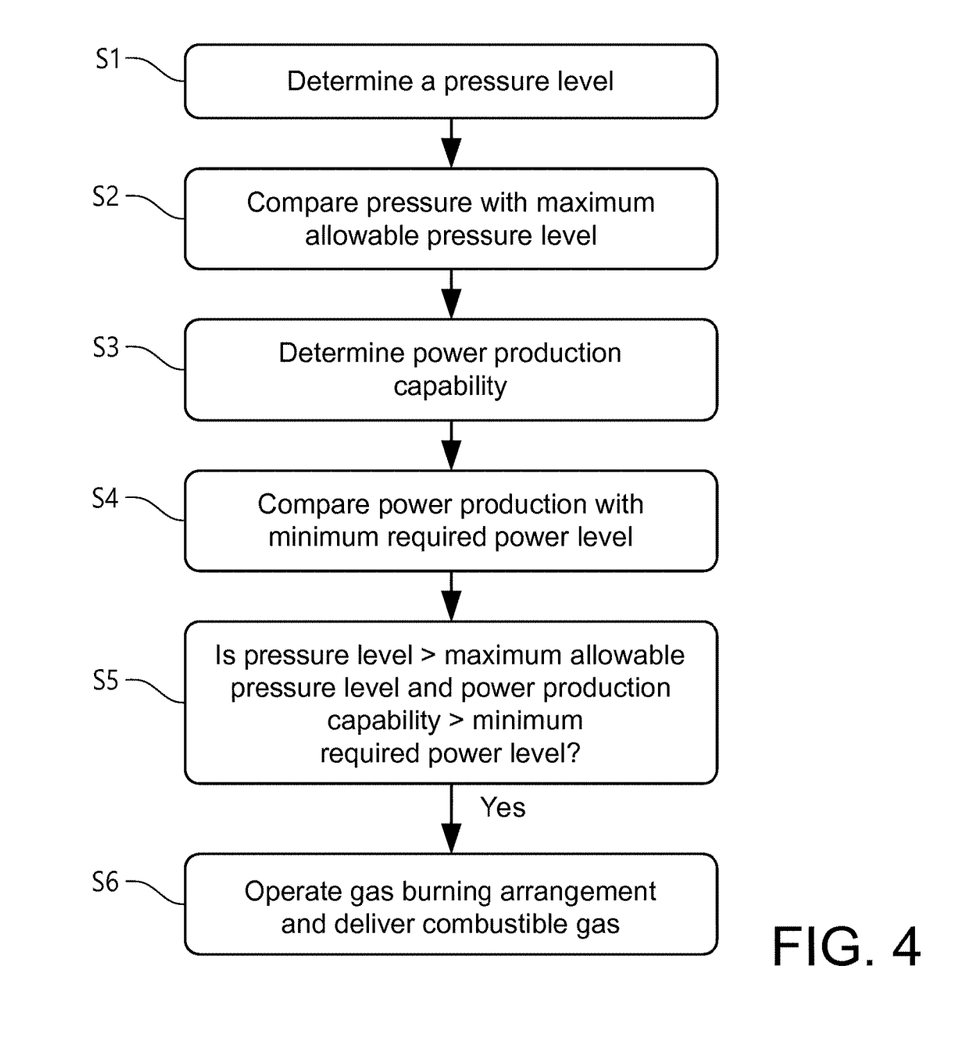
FIG. 4 is a flow chart of a method for controlling a gas tank arrangement according to an example embodiment.

In order to describe the functionality and method of controlling the gas tank arrangement depicted in FIGS. 2 and 3 according to an example embodiment, reference is made to FIG. 4 in combination with FIGS. 2 and 3.

When controlling the gas tank arrangement 100, or in particular the flow of combustible gaseous fuel in the gas tank arrangement 100, the pressure level within the gas tank 2 is determined S1. This is preferably made by the control unit 6 receiving a signal from the pressure sensor 12 indicative of the current pressure level within the gas tank 2. The control unit 6 compares S2 the pressure level with a maximum allowable gas pressure level. The maximum allowable gas pressure level may be based on a pressure level at which the gas tank 2 is in need of ventilation, i.e. the combustible gaseous fuel in the gas tank has expanded, caused by e.g. an increased temperature level of the gas tank 2, such that ventilation of the gas tank 2 is necessary. The maximum allowable gas pressure level is preferably a pressure level slightly below what the gas tank is able to handle for venting the gas tank prior to such an event.

Furthermore, the control unit 6 also determines S3 a current/present power production capability of the power generating arrangement 4, i.e. determines how much electrical power the power generating arrangement 4 is able to supply to the gas burning arrangement 5. In order for the control unit 6 to determine current/present power production capability of the power generating arrangement 4, the control unit 6 receives a signal from the power generating sensor 11 indicative of the current/present power production capability of the power generating arrangement 4. The control unit 6 also compares S4 the current/present power production capability of the power generating arrangement 4 with a minimum required power level for propelling the gas burning arrangement 5, i.e. the electrical power needed for being able to operate the gas burning arrangement 5.

The control unit 6 thereafter determines if the pressure level within the gas tank 2 is above the maximum allowable gas pressure level, i.e. if the gas tank 2 is in need of ventilation. The control unit 6 also determines if the current/present power production capability of the electrical power generating arrangement 4 is higher than the minimum required power level i.e. if the gas burning arrangement 5 is able to be propelled by the current/present electrical power level of the electrical power generating arrangement 4.

if the pressure level within the gas tank 2 is above the maximum allowable gas pressure level and the current power production capability of the electrical power generating arrangement 4 is higher than the minimum required power level, the control unit 6 controls S5 the gas burning arrangement 5 to be operated by the electric power generated by the electrical power generating arrangement 4 and the gas tank 2 to deliver combustible fuel to the gas burning arrangement 5 for combustion therein.

The control unit 6 described above may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art.

The invention claimed is:

1. A gas tank arrangement for an internal combustion engine of a vehicle, said gas tank arrangement comprising a gas tank for containing a combustible fuel; an electrically propelled gas burning arrangement provided downstream the gas tank; an electrical power generating arrangement connected to the electrically propelled gas burning arrangement for controllably delivery of electric power to the electrically propelled gas burning arrangement; and a control unit connected to the electrically propelled gas burning arrangement and to the electrical power generating arrangement, wherein the control unit is configured to:
   determine a pressure level within the gas tank;
   compare the pressure level with a maximum allowable gas pressure level;
   determine a current power production capability of the electrical power generating arrangement;
   compare the current power production capability with a minimum required power level for propelling the gas burning arrangement; and
   if the pressure level within the gas tank is above said maximum allowable gas pressure level and the current power production capability of the electrical power generating arrangement is higher than said minimum required power level:
      control the gas burning arrangement to be operated by the electric power generated by the electrical power generating arrangement; and
      control the gas tank to deliver combustible fuel to the gas burning arrangement for combustion therein.

2. The gas tank arrangement according to claim 1, wherein the control unit is further configured to:
   determine an amount of combustible fuel which is combustible in the gas burning arrangement by means of the current power production capability of the electrical power generating arrangement; and
   control the gas tank to delivery said amount of combustible fuel to the gas burning arrangement.

3. The gas tank arrangement according to claim 1, wherein the gas tank arrangement further comprises a first electrical storage arrangement connected between the electrical power generating arrangement and the gas burning arrangement.

4. The gas tank arrangement according to claim 3, said control unit being further connected to said first electrical storage arrangement, wherein the control unit is further configured to:
   compare the current power production capability of the electrical power generating arrangement with a maximum power level consumable by the gas burning arrangement; and
   if the current power production capability is higher than the maximum power level:
   control at least a portion of the electrical power generated by the electrical power generating arrangement to be provided to the first electrical storage arrangement.

5. The gas tank arrangement according to claim 3, wherein the control unit is further configured to:
   control said first electrical storage arrangement to provide electrical power to the gas burning arrangement if the pressure level within the gas tank is above said maximum allowable gas pressure level and the current power production capability of the electrical power generating arrangement is lower than said minimum required power level.

6. The gas tank arrangement according to claim 1, wherein the gas tank arrangement further comprises a valve unit arranged in fluid communication between the gas tank and the gas burning arrangement, wherein the control unit is connected to said valve unit and further configured to controllably arranged the valve unit between a first state in which combustible fuel is delivered from the gas tank to the gas burning arrangement, and a second state in which the gas tank is prevented from delivery of combustible fuel to the gas burning arrangement.

7. The gas tank arrangement according to claim 1, wherein the gas tank further comprises a gas pressure sensor for detecting the gas pressure within the gas tank.

8. The gas tank arrangement according to claim 1, wherein the electrical power generating arrangement comprises a power generation sensor for detecting the present electric power generating level provided by the electrical power generating arrangement.

9. The gas tank arrangement according to claim 1, wherein the electrically propelled gas burning arrangement is further electrically connected to a second electrical storage arrangement of the vehicle, said second electrical storage arrangement being further arranged to control start ignition of the internal combustion engine.

10. The gas tank arrangement according to claim 1, wherein said electrical power generating arrangement comprises solar cells for generating electrical power.

11. The gas tank arrangement according to claim 10, wherein the solar cells are arranged on at least one of a roof or a wind deflector of the vehicle.

12. A vehicle comprising an internal combustion engine and a gas tank arrangement according to claim 1, wherein the gas tank arrangement is arranged upstream the internal combustion engine for delivery of combustible fuel to the internal combustion engine.

13. A method for controlling a gas tank arrangement for an internal combustion engine of a vehicle, said gas tank arrangement comprising a gas tank for containing a combustible fuel; an electrically propelled gas burning arrangement provided downstream the gas tank; an electrical power generating arrangement connected to the electrically propelled gas burning arrangement for controllably delivery of electric power to the electrically propelled gas burning arrangement, wherein the method comprises the steps of:
   determining a pressure level within the gas tank;
   comparing the pressure level with a maximum allowable gas pressure level;
   determining a current power production capability of the electrical power generating arrangement;
   comparing the current power production capability with a minimum required power level for propelling the gas burning arrangement; and
   if the pressure level within the gas tank is above said maximum allowable gas pressure level and the current power production capability of the electrical power generating arrangement is higher than said minimum required power level:
      operating the gas burning arrangement by the electric power generated by the electrical power generating arrangement; and
      providing combustible fuel from the gas tank to the gas burning arrangement for combustion therein.

14. A computer program comprising program code means for performing the steps of claim 13 when said program is run on a computer.

15. A computer readable medium carrying a computer program comprising program means for performing the steps of claim 13 when said program means is run on a computer.

\* \* \* \* \*